(12) United States Patent
Man et al.

(10) Patent No.: US 8,898,790 B2
(45) Date of Patent: Nov. 25, 2014

(54) METHOD FOR PREVENTING A MOBILE COMMUNICATION DEVICE FROM LEAKING SECRET AND SYSTEM THEREOF

(75) Inventors: Zhiyong Man, Beijing (CN); Yu Lin, Beijing (CN); Shihong Zou, Beijing (CN)

(73) Assignee: Netqin Mobile (Beijing) Co., Ltd., Beijing (CN)

( * ) Notice: Subject to any disclaimer, the term of this patent is extended or adjusted under 35 U.S.C. 154(b) by 44 days.

(21) Appl. No.: 13/587,409

(22) Filed: Aug. 16, 2012

(65) Prior Publication Data
US 2013/0047256 A1 Feb. 21, 2013

(30) Foreign Application Priority Data
Aug. 18, 2011 (CN) .......................... 2011 1 0239374

(51) Int. Cl.
*G06F 12/14* (2006.01)
*G06F 21/53* (2013.01)
*G06F 21/62* (2013.01)

(52) U.S. Cl.
CPC ............ *G06F 21/53* (2013.01); *G06F 21/6218* (2013.01); *G06F 2221/2149* (2013.01)
USPC .......................................................... 726/24

(58) Field of Classification Search
None
See application file for complete search history.

(56) References Cited

U.S. PATENT DOCUMENTS

2007/0206546 A1* 9/2007 Alberth et al. ................ 370/338
2012/0054853 A1* 3/2012 Gupta et al. .................... 726/17

* cited by examiner

*Primary Examiner* — Brandon Hoffman
(74) *Attorney, Agent, or Firm* — Scully, Scott, Murphy & Presser, P.C.

(57) ABSTRACT

The invention provides a method for preventing a mobile communication device from leaking secret and a system thereof. In the method, by adopting a mobile communication device side and PC side structure, a controlling module installation package is transferred from a PC side to the mobile communication device; a controlling module runs automatically and obtains root privilege of the operating system of the mobile communication device; the controlling module forbids functions of silently dialing, silently answering, photo taking, video recording, voice recording, Bluetooth and infrared connection. The advantages of the present invention are that the present invention is suitable for on-site operation and possibility of leaking secret by any mobile communication device is eliminated by a PC terminal.

12 Claims, 3 Drawing Sheets

METHOD FOR PREVENTING A MOBILE COMMUNICATION DEVICE FROM LEAKING SECRET AND SYSTEM THEREOF

CROSS REFERENCE TO RELATED APPLICATIONS

This application claims priority to Chinese Patent Application No. 201110239374.5, filed on Aug. 18, 2011, the entire content of which is incorporated herein by reference.

FIELD OF THE INVENTION

The invention relates to mobile communication field, and more particularly to a method for preventing a mobile communication device from leaking secret and a system thereof.

BACKGROUND OF THE INVENTION

The functions of a current mobile communication device have been enhanced, for example, a mobile phone not only has a function such as voice call but also can realize functions such as photo taking, video recording, voice recording and 3G internet surfing, etc. Because a mobile phone and its user are always together, the photo, video or voice recorded in the mobile phone might easily become a source of leaking privacy of the user. In addition, the circumstances and other people around the mobile phone user are at the risk of secret leakage as well.

At the end of year 2006, a mobile phone virus called Flexispy spreaded widely among smart phone users. Once the virus is planted in a mobile phone of a user, the virus can fully monitor the contents such as call log, text messages, and the like, of the user. Unbeknown to the user, the privacy information of the user is stolen.

By implementing function of monitoring, Flexispy virus can monitor a mobile phone infected with the virus so as to turn the infected mobile phone into a bug. A secret stealer can use a monitor number to make a call to a target mobile phone infected with the Flexispy virus. If the target mobile phone is in free status, the call made by the secret stealer might be put through and the Flexispy virus will automatically activate the microphone speaker of the target mobile phone. Without anything displayed on the target mobile phone, the target mobile phone is an equivalent of a bug around its user at that time and the stealer can hear the sound surrounding the target mobile phone clearly. If the target mobile phone is in using or the user of the target mobile phone presses any key, the call of the secret stealer will be disconnected and no trace is left.

Following the approach of Flexispy virus, such kind of virus develops many effective ways of stealing secret. For example, recording is made as scheduled or once the infected mobile phone starts a call; and the recording is sent to the secret stealer by functions of 3G internet surfing or e-mail regularly. In addition, the secret stealer also finds favor in the functions of photo taking or video recording of the mobile phone.

The anti-virus software or security software of the current mobile phones further needs to identify a known virus or the variation of the known virus and limits the function of virus or clears the virus by way of killing virus after identifying the virus exist. But much of newly appeared virus obtains the root privilege for controlling the mobile phone by using the newly discovered vulnerabilities of the operating system of the mobile phone. Those newly appeared virus not only is camouflaged as system program but also limits the functions of the anti-virus software. The anti-virus means in the prior art can not prevent the mobile communication device from leaking secret completely.

Therefore, a solution which can prevent the mobile device from leaking secret as possible is required. The method should decrease the possibilities of leaking secret by a mobile phone in a special circumstance such as commercial negotiation place or other situations which requires keeping secret as possible while the mobile phone also keeps its basic function normally.

SUMMARY OF THE INVENTION

In order to solve problems existing in the prior art, the invention provides a method for preventing a mobile communication device from leaking secret by connecting a PC to the mobile communication device. In the method, by adopting a mobile communication device side and PC side structure, a controlling module installation package is transferred from a PC side to the mobile communication device; a controlling module runs automatically and obtains root privilege of the operating system of the mobile communication device; the controlling module forbids functions of silently dialing, silently answering, photo taking, video recording, voice recording, Bluetooth and infrared connection of the mobile communication device.

According to an embodiment of the present invention, the method for preventing a mobile communication device from leaking secret further comprises the PC side monitoring the operating system platform of the mobile communication device and selecting an appropriate client side module installation package to transfer according to the operating system platform.

According to an embodiment of the present invention, the method for preventing a mobile communication device from leaking secret further comprises setting the mobile communication device to be in airplane mode.

According to an embodiment of the present invention, the method for preventing a mobile communication device from leaking secret further comprises the client side killing a virus program(s) in the mobile communication device.

According to an embodiment of the present invention, the method for preventing a mobile communication device from leaking secret further comprises the client side setting the mobile communication device to be in safe mode; the client side setting the mobile communication device to be in safe mode comprises terminating other applications in the mobile communication device except for the client side.

According to an embodiment of the present invention, in the method for preventing a mobile communication device from leaking secret, the client side setting the mobile communication device to be in safe mode comprises terminating a suspicious process(es) camouflaged as an operating process(es) so as to normally close the suspicious process(es) without affecting the normal operation of the mobile communication device.

According to an embodiment of the present invention, in the method for preventing a mobile communication device from leaking secret, the client side obtaining root privilege of the operating system of the mobile communication device comprises preventing the suspicious process(es) from interfering with the controlling module.

Compared with the method for preventing leaking secret in the prior art, the present invention can guarantee implementation of fundamental functions of a mobile phone and forbid mobile phone functions which might cause secret leakage.

In addition, the present invention further provides a cross-platform solution and is adaptable for different operating system platforms applied by mobile communication devices.

In addition, the present invention can preventing a peeping or monitoring virus(es) from obtaining root privilege of a mobile communication device by performing antivirus operation.

BRIEF DESCRIPTION OF THE DRAWINGS

Other characteristics and advantages of the present invention appear from or illustrated by the following detailed description given with reference to the accompanying drawings, the accompanying drawings and detailed description of the present invention serve to explain the specific principles of the present invention.

DETAILED DESCRIPTION OF THE INVENTION

Embodiments of the invention will be described hereinafter with reference to the accompanying drawings. While the present invention has been described with respect to illustrative embodiments, it is to be understood that the invention is not limited to those illustrative embodiments. On the contrary, it is intended that the invention not only covers those illustrative embodiments but also covers all such alternations, modifications, equivalents and other embodiments as fall within the spirit and scope of the appended claims of the present invention.

The invention provides a method for preventing a mobile communication device from leaking secret. The invention is suitable for on-site operation and can eliminate possibilities of leaking secret by any mobile communication device via a PC terminal.

Figure 1:
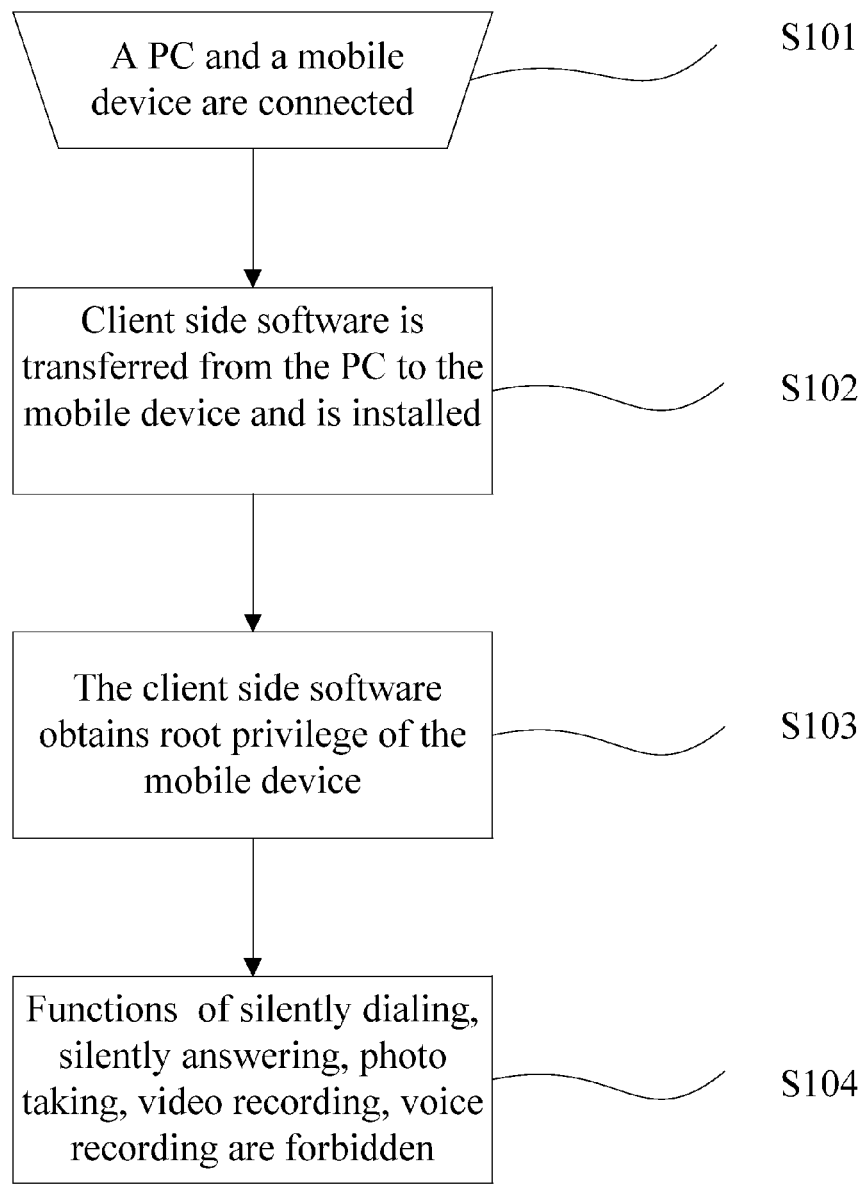
FIG. 1 is a flowchart according to an embodiment of the present invention.

According to an embodiment of the present invention and shown as FIG. 1, in step S101, a PC and are connected; in step S102, client side software is transferred from the PC to the mobile device and is installed; in step S103, the client side software obtains root privilege of the operating system of the mobile device; in step S104, a client side forbids functions of the mobile device, such as silently dialing, silently answering, photo taking, video recording, voice recording, infrared and Bluetooth connection.

Figure 2:
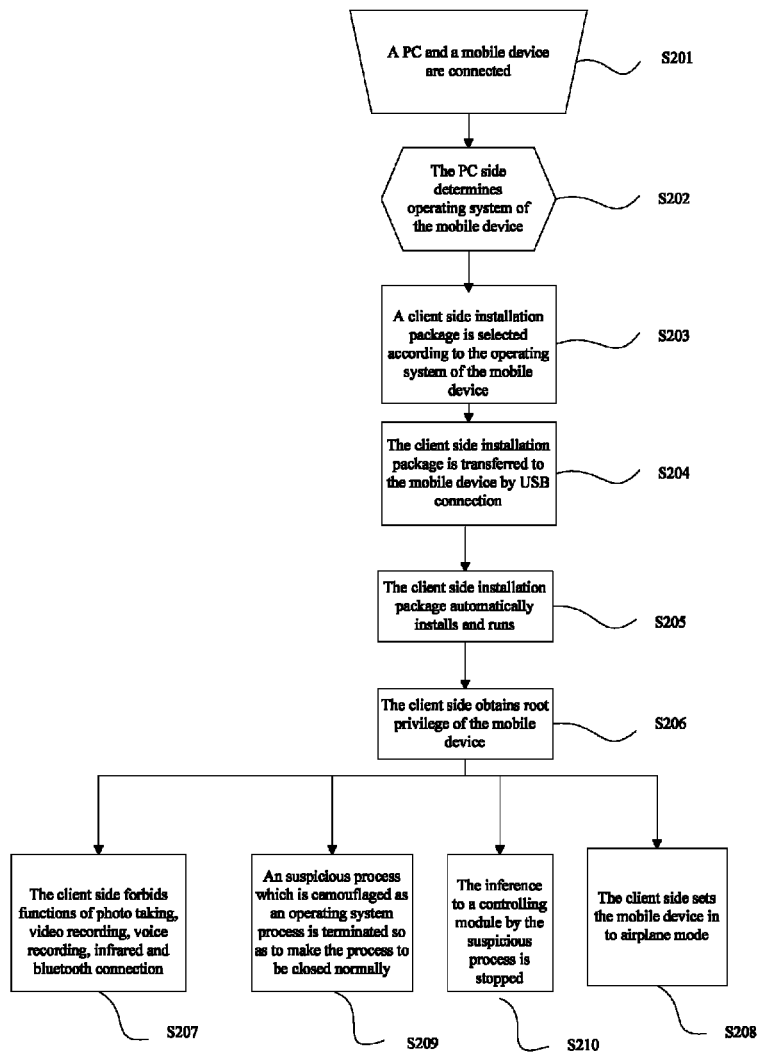
FIG. 2 is a flowchart according to another embodiment of the present invention.

According to an embodiment of the invention, an operating process of preventing a mobile communication device from leaking secret is shown as FIG. 2. According to the present embodiment, the mobile communication device is a mobile phone and the operation system platform of the mobile communication device is Android operation system. Those skilled in the art can understand that the method of the present invention not only is adaptable for the mobile phone with Android system but also mobile phones with other operation system platforms such as Symbian system or iOS system.

In step S201, the PC and the mobile communication device are connected. Optionally, the PC and the mobile communication device are connected via a USB interface. Those skilled in the art can understand that, in order to achieve the purpose of the present invention, other ways of connection such as infrared or Bluetooth connection is also adaptable for the method of the present invention.

In step S202, the PC side determines the type of the operation system of the mobile phone.

In step S203, a client side installation package is selected according to the type of the operation system of the mobile phone. For example, the adaptable format of installation package of Symbian operation system is SIS or SISX; the adaptable format of the installation package of Android operation system is apk.

In step S204, the client side package is transferred to the mobile phone by USB connection. Those skilled in the art can understand that, in order to achieve the purpose of the present invention, other ways of connection such as infrared or Bluetooth connection are also adaptable for the method of the present invention.

In step S205, the client side installation package is automatically installed and runs. An installation tool runs at the PC side, e.g. Android Debug Bridge (ADB) of Google is used to install proxy program at mobile phone side. After successful installation, the proxy program is initiated and TCP request at PC port is monitored. After step 205, the PC side can disconnect from the mobile communication device except for the case of requesting for killing virus program in the mobile communication device by the PC side.

In step 206, the client side obtains root privilege of the mobile phone. Those skilled in the art can understand that, for different mobile terminal operating systems, there are similar methods for obtaining root privilege and all those methods can achieve the purpose of the present invention. It is unnecessary to introduce those methods one by one. For example, as for Android operating system, the root privilege can be obtained by opening WIFI (wireless local area network) and then udev (Linux kernel 2.6 series device manager) message is used to transfer a section of privilege elevation program to kernel for the system to execute. In Android system, udev mechanism is used for performing hot plug and udev mechanism is realized in init code. The init process is a user-level process initiated by the kernel. After the kernel is initiated by itself (i.e. the kernel has been loaded into memory, started to run and initialized all device drive program and data structure, etc.), the boot process is completed by a way of initiating a user-level program init.

Therefore, the init process is the first process all along (the Number of the init is 1 all along). When a hardware device is inserted into a hardware device with Android operating system, a message will be sent to init process via socket. The message includes the operation to be performed, for example, creating a device file. Therefore, when the init performs operations like that, the init uses the ROOT privilege (super administrator user privilege of Android operating system, i.e. system operating privilege). Since udev mechanism does not check whether the message comes from system kernel, therefore if an application sends a udev message to init, the operations guided by the udev message will be performed with the executing of root privilege. Therefore, if a client side program registers a hot plug device in the kernel, the program will be executed only by opening/closing WIFI or plugging/pulling the USB device so as to obtain the ROOT privilege.

In step S207, the client side forbids the functions of photo taking, video making, voice recording, infrared and Bluetooth connection and monitors events of silently answering and silently dialing. After the client side obtained the root privilege, the client side can perform operation on respective program or system files in the mobile phone. For example, in a HTC mobile phone, the apk file corresponding to the Camera program package can be moved out to a backup folder so as to invalidate the function of photo taking. Based on the same principle, the functions, such as video recording, voice recording, etc. can be invalidated by moving apk file corresponding to related program packages.

As for the Bluetooth function of the mobile phone, the client side can turn off the Bluetooth transmission function of the mobile phone by Settings.System.putInt(getContentResolver( ), Settings.System.BLUETOOTH_ON, 0).

Silently answering and silently dialing are two kinds of operations which are often triggered by mobile phone virus. Specifically, silently answering refers to when the mobile receives an incoming call, the tone of ring or vibration is forbidden and the call is activated without manual operation of the user. Silently dialing refers to preset a number of an outgoing call so as to activate a call without manual operation of the user and the display related to dialing the number is forbidden on the screen. For the possible operations above performed by virus, the client side checks whether an unauthorized outgoing call link or incoming call link exists once every one minute. The way of checking authorization includes checking whether the user operation before making an outgoing call is dialing a number or an operation on phonebook contacts; and checking whether the user actively touches a corresponding button on the interface to build connection before building the link of an incoming call. When an unauthorized outgoing call link or incoming call link is found, the client side stops corresponding call process right away and reports the current checking result.

Optically, in step S208, the client side sets the mobile phone to be in Airplane mode. The client side can determine whether the mobile phone is in Airplane mode by AirPlaneModeOn=Settings.System.getInt(mContext.getContentResolver( ), Settings.System.AIRPLANE_MODE_ON, 0)==1? True: false. The mobile phone is set to be in Airplane mode by the instruction as follows: Settings.System.putInt(getContentResolver( ), Settings.System.AIRPLANE_MODE_ON, 1).

In step S209, a suspicious process(es) which is camouflaged as an operating system process(es) is terminated so as to make the process to be closed normally. Because the virus program(s) may set itself to be kernel process by User:: SetCritical( ) function, therefore using normal method may can not terminate the virus program(s). Therefore, if a process except for disks C and E is found being running now, the first thing to do should be checking Critical attribution of the process, if the Critical attribution is System, the process should be terminated in kernel mode by LDD technology.

In step S210, the inference to a controlling module by the suspicious process(es) is stopped. After step S209, any suspicious system process should be terminated. However, the suspicious system process(es) can inject its codes into the process of a system file server or a graph drawing server by some technologies so as to prevent the validation of the technology of the present patent. This case should be found and stopped by searching for the components of disk C or disk E loaded by the system. For example, iphook technology in Symbian platform can realize injecting codes into a network server to execute; the codes should be deleted or moved from the disk so as to make the codes to be invalidated.

According to an embodiment of the present invention, when the mobile communication device requires to remove the control of preventing leaking secret, e.g. the holder of the mobile phone leaves a meeting place, an office of a company or areas under the security control, the method of the invention further includes removing control of preventing leaking secret. Specifically, the infrared and Bluetooth function can be activated by corresponding settings of the mobile communication device; the functions of photo taking, video recording and voice recording, the functions will be restored by restoring corresponding modified or moved corresponding application file; for the forbidding of the silently answering and the silently dialing, the monitoring of the silently answering and the silently dialing is removed by deleting monitoring application and the function restricting program; for the airplane mode, corresponding settings in the mobile communication device are used to delete airplane mode settings or set the airplane mode to be in other general modes. Those skilled in the art can appreciate that removing restriction further includes means such as deleting client side program and the register value of the client side program, etc.

Figure 3:
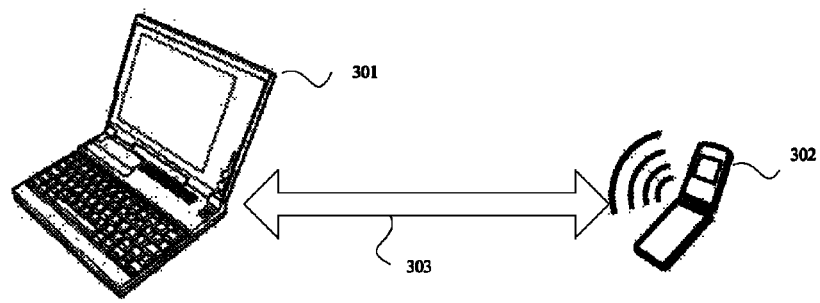
FIG. 3 is a systematic diagram illustrating preventing a mobile communication from leaking secret according to the present invention.

According to an embodiment of the present invention and shown as FIG. 3, the system of preventing a communication device from leaking secret includes a PC side 301, a mobile communication device client side 302 and a connection 303. The PC side can be any personal computer, laptop or working station with functions of storing and computing and a communicating interface. The mobile communication device client side 302 is installed on the mobile communication device and the mobile communicating device can communicate with a base station or another computing device such as a PC. The connection 303 can be any connection which can realize the connection between the PC and the mobile communication device and the connection 303 includes USB connection line, infrared connection or Bluetooth connection.

Figure 4:
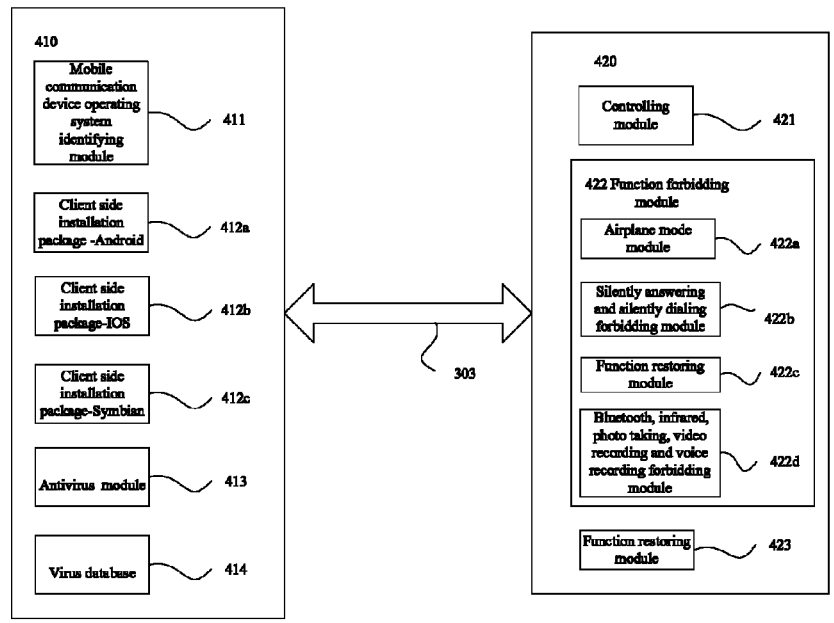
FIG. 4 is a systematic diagram illustrating preventing a mobile communication from leaking secret by implementing the present invention.

According to an embodiment of the present invention and shown as FIG. 4, the system of preventing a communication device from leaking secret includes a PC side 410, a mobile communication device client side 420 and the connection 303. The PC side 410 includes a mobile communication device operating system identifying module 411, a plurality of client side installation packages 412a, 412b and 412c, an antivirus module 413 and a virus database 414.

The mobile communication device operating system identifying module 411 communicates with the mobile communication device via the connection 303, reads and identifies mobile communication device operating system, for example, Symbian, iOS or Android operating system.

The client side installation packages 412a, 412b and 412c communicate with the mobile communication device operating system identifying module 411 and are sent to the mobile communication device via the connection 303. According to the type of the operating system of the mobile communication device identified by the mobile communication device operating system identifying module 411, the PC side sends corresponding client side installation package 412a, 412b or 412c to the mobile communication device.

The antivirus module 413 communicates with the mobile communication device client side 420 and verifies whether the file or application installed at the mobile communication device client side 420 contains virus by reading the virus signature code of the virus file or application in the virus database 414.

After the mobile communication device received the client side installation package 412a, 412b or 412c, the packages are automatically installed at the corresponding directory and client side program 420 is generated and automatically runs. The client side 420 includes a controlling module 421, a function forbidding module 422 and a function restoring module 423.

The controlling module 421 communicates with the mobile communication device. The controlling module can obtain root privilege of the mobile communication device, for example, Root privilege of Android operating system.

According to an embodiment of the present invention, the controlling module 421 makes the client side program obtain the root privilege by virtual hardware register.

The function forbidding module 422 can communicate with the mobile communication device operating system to forbid functions of photo taking, video recording, voice recording, infrared and Bluetooth connection and monitor events of silently answering and silently dialing. The function forbidding module 422 further includes an airplane mode module 422a, a silently answering and silently dialing forbidding module 422b, a function restoring module 422c and a Bluetooth, infrared, photo taking, video recording and voice recording forbidding module 422d.

The airplane mode module 422a can communicate with the operating system of the mobile communication device and set the mobile communication device to be in the airplane mode by setting corresponding parameters, for example, AirPlaneModeOn parameter.

The silently answering and silently dialing forbidding module 422b communicates with the operating system of the mobile communicating device to check whether an authorized outgoing call link or incoming call link exists once every one minute. The way of checking authorization includes checking whether the user operation before making an outgoing call is dialing a number or an operation on phonebook contacts; checking whether the user actively touches a corresponding button on the interface to build connection before building the link of an incoming call. When an unauthorized outgoing call link or incoming call link is found, the silently answering and silently dialing forbidding module 422b stops corresponding call process right away and reports the current checking result.

The Bluetooth, infrared, photo taking, video recording and voice recording forbidding module 422d communicates with the mobile communication device. The functions of Bluetooth and infrared of the mobile communication device are closed by corresponding settings of the mobile communication device. The functions of photo taking, video recording and voice recording of the mobile communicating device are invalidated by renaming corresponding programs.

The function restoring module 422c communicates with the mobile communication device, the airplane mode module 422a, the silently answering and silently dialing forbidding module 422b and the Bluetooth, infrared, photo taking, video recording and voice recording forbidding module 422d. For the airplane mode, the mobile communicating device exits the airplane mode by restoring corresponding settings. The functions of photo taking, video recording and voice recording can be restored by restoring the modified or moved corresponding program file. For the forbidding of silent answering and silent dialing, the monitoring of silently answering and silently dialing will be removed by deleting monitoring program and function restricting program. Optically, the function restoring module 422c can delete the client side 420 and delete the register value of the client side 420 in the mobile communication operating system as well.

Specific embodiments of and examples for the invention are described above for illustrative purposes. The above detailed description of the embodiments of the invention is not to be exhaustive or limit the invention to the precise form disclosed above. Obviously, various variants and modifications are possible according to the above disclosure. The embodiments are chosen and described so that those skilled in the art can appreciate and understand the principles and practices of the present invention and alternatives and modifications. In fact, the scope of the invention is limited by the appended claims and equivalents thereof.

We claim:

1. A method for preventing a mobile communication device from leaking secret in a region under security control, comprising:
    by using a mobile communication device client side and PC side structure, sending a client side module installation package from the PC side to the mobile communication device;
    the client side module running automatically and obtaining root privilege of the operating system of the mobile communication device; and
    the client side module forbidding the functions consisting of silently dialing, silently answering, photo taking, video recording, voice recording, infrared and Bluetooth connection, while maintaining the function of the mobile communication device to make or receive a phone call.

2. The method of claim 1, further comprises the PC side monitoring the operating system platform of the mobile communication device and selecting an appropriate client side module installation package to transfer according to the operating system platform.

3. The method of claim 1, further comprises setting the mobile communication device to be in airplane mode.

4. The method of claim 1, further comprises the client side killing a virus program(s) in the mobile communication device.

5. The method of claim 4, further comprises the client side setting the mobile communication device to be in safe mode, wherein the client side setting the mobile communication device to be in safe mode comprises terminating other applications in the mobile communication device except for the client side.

6. The method of claim 5, wherein the client side setting the mobile communication device to be in safe mode comprises terminating a suspicious process(es) camouflaged as an operating system process(es) so as to normally close the suspicious process(es) without affecting the normal operation of the mobile communication device.

7. The method of claim 4, wherein the client side obtaining root privilege of the operating system of the mobile communication device comprises preventing the suspicious process(es) from interfering with the controlling module.

8. The method of claim 1, further comprises enabling the forbidden functions of the mobile communication device, when the mobile communication device is no longer in the region under security control.

9. A system of preventing a mobile communication device from leaking secret in a region under security control, comprising a client side and a PC side;
    wherein the PC side is configured for storing a client side installation package and transferring the client side installation package to the mobile communication device via a communication interface;
    wherein the client side installation package is configured for automatically installing and running the client side in the mobile communication device and the client side comprises a controlling module;
    wherein the controlling module is configured for communicating with the mobile communication device and obtaining root privilege of the operating system of the mobile communication device; and the controlling module is configured for forbidding the functions consisting of silently dialing, photo taking, video recording, voice recording, infrared and Bluetooth connection, while maintaining the function of the mobile communication device to make or receive a phone call.

10. The system of claim 9, wherein the PC side further comprises an antivirus module and a virus database; the antivirus module is configured for communicating with the mobile communication device and the virus database, using a virus signature file stored in the virus database to scan a file(s) in the mobile communication device and eliminating virus file; the virus database is configured for communicating with the antivirus module and storing a large quantity of virus signature files.

11. The system of claim 9, wherein the PC side further comprises a mobile communication device operating system identifying module; the mobile communication device operating system identifying module is configured for communicating with the mobile communicating device, identifying the operating system of the mobile communication device and selecting a client side package according to the operating system.

12. The system of claim 9, wherein the controlling module is further configured for enabling the forbidden functions of the mobile communication device, when the mobile communication device is no longer in the region under security control.

* * * * *